(12) United States Patent
Hudson

(10) Patent No.: US 10,545,022 B2
(45) Date of Patent: Jan. 28, 2020

(54) PROXIMITY NAVIGATION

(71) Applicant: TRANSFORM SR BRANDS LLC, Hoffman Estates, IL (US)

(72) Inventor: Robert C. Hudson, Naperville, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 148 days.

(21) Appl. No.: 13/800,722

(22) Filed: Mar. 13, 2013

(65) Prior Publication Data
US 2014/0282134 A1  Sep. 18, 2014

(51) Int. Cl.
*G06F 3/0484* (2013.01)
*G06F 3/0482* (2013.01)
*G01C 21/20* (2006.01)

(52) U.S. Cl.
CPC .................................. *G01C 21/20* (2013.01)

(58) Field of Classification Search
CPC ......... G06F 17/30041; G06F 17/30241; G06F 17/3087
See application file for complete search history.

(56) References Cited

U.S. PATENT DOCUMENTS

| | | | |
|---|---|---|---|
| 6,522,875 B1* | 2/2003 | Dowling | H04L 12/1859 455/414.3 |
| 8,473,200 B1* | 6/2013 | Manber | G01C 21/3644 701/428 |
| 2002/0011951 A1* | 1/2002 | Pepin | G09B 29/008 342/357.34 |
| 2003/0105584 A1* | 6/2003 | Cato | G01C 21/20 701/416 |
| 2003/0136831 A1* | 7/2003 | Alford | G09B 29/003 235/383 |
| 2004/0102197 A1* | 5/2004 | Dietz | G06F 17/30893 455/456.1 |
| 2004/0128069 A1* | 7/2004 | Cato | G01C 21/20 701/433 |
| 2006/0059049 A1* | 3/2006 | Morris | G06Q 30/02 705/26.1 |
| 2007/0200674 A1* | 8/2007 | Moore | G01C 21/26 340/5.74 |
| 2008/0074264 A1* | 3/2008 | Sharpe | H04L 67/20 340/572.1 |
| 2008/0155460 A1* | 6/2008 | Scott | G06F 3/0485 715/784 |
| 2008/0228385 A1* | 9/2008 | Geelen | G01C 21/3641 701/533 |
| 2010/0030624 A1* | 2/2010 | Vanska | G01C 21/20 705/14.64 |
| 2010/0057345 A1* | 3/2010 | Baldi | G01C 21/20 701/533 |
| 2010/0274482 A1* | 10/2010 | Feng | G01C 21/3679 701/431 |
| 2012/0017166 A1* | 1/2012 | Watt | H04W 4/02 715/771 |
| 2012/0021774 A1* | 1/2012 | Mehta | G06Q 30/0282 455/456.3 |

(Continued)

*Primary Examiner* — Rayeez R Chowdhury
(74) *Attorney, Agent, or Firm* — McAndrews, Held & Malloy, Ltd.

(57) ABSTRACT

A system and method that that triggers actions or sets of actions within a software application executed on a mobile device based at least in part on location identifiers.

31 Claims, 3 Drawing Sheets

(56) References Cited

U.S. PATENT DOCUMENTS

| | | | |
|---|---|---|---|
| 2012/0209608 A1* | 8/2012 | Lee | G06F 3/167 |
| | | | 704/246 |
| 2013/0054420 A1* | 2/2013 | Rekimoto | G06F 3/002 |
| | | | 705/26.61 |
| 2013/0317916 A1* | 11/2013 | Gopalakrishnan | G06Q 30/0261 |
| | | | 705/14.66 |
| 2013/0325856 A1* | 12/2013 | Soto Matamala | H04W 4/21 |
| | | | 707/724 |

* cited by examiner

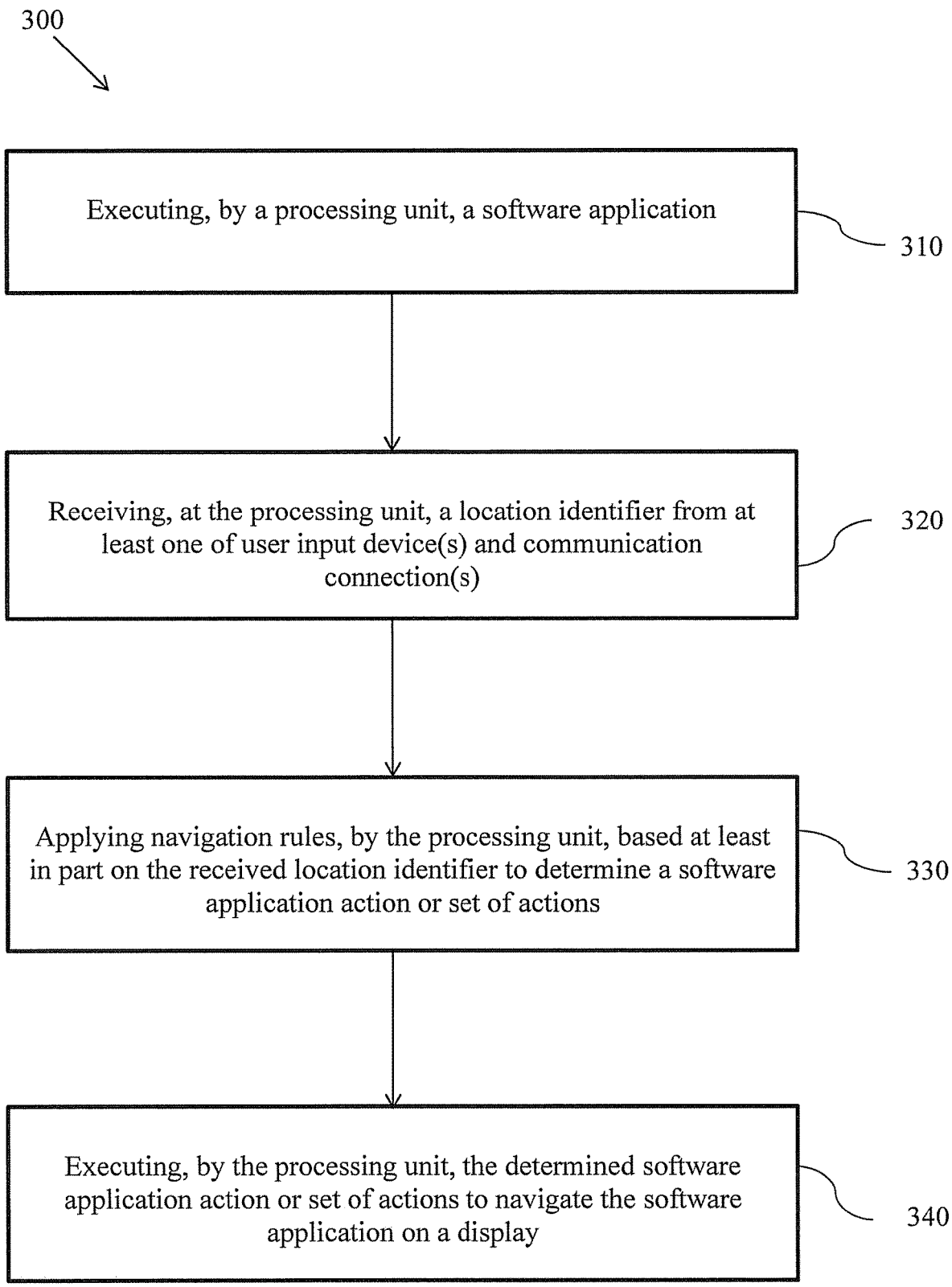

PROXIMITY NAVIGATION

FIELD OF THE INVENTION

Certain embodiments of the invention relate to systems and methods for navigating a software application. More specifically, certain embodiments of the present invention relate to systems and methods that trigger actions or sets of actions within a software application executed on a mobile device based at least in part on location identifiers.

BACKGROUND OF THE INVENTION

Technology, such as the use of internet-connected tablets or other mobile devices, can help simplify and empower a sales process by providing a sales associate, customer, or other user, supplemental information regarding products, promotions, and the like. For example, while moving to a region of a store based on a customer's expressed interest in a type of product, a sales associate may navigate mobile device software to a corresponding section of the application to access information regarding available products, price and promotion information, product specifications, and product reviews, among other things. At the present time, however, the amount of interaction required to navigate the software application is a barrier to interpersonal interactions rendering the sales process unnatural because a sales associate attempting to navigate the software application may be distracted from focusing on the customer.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method that triggers actions or sets of actions within a software application executed on a mobile device based at least in part on location identifiers, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 3 is a flowchart illustrating an exemplary method for navigating a software application, in accordance with a representative embodiment of the present invention.

DETAILED DESCRIPTION OF THE INVENTION

Figure 1:
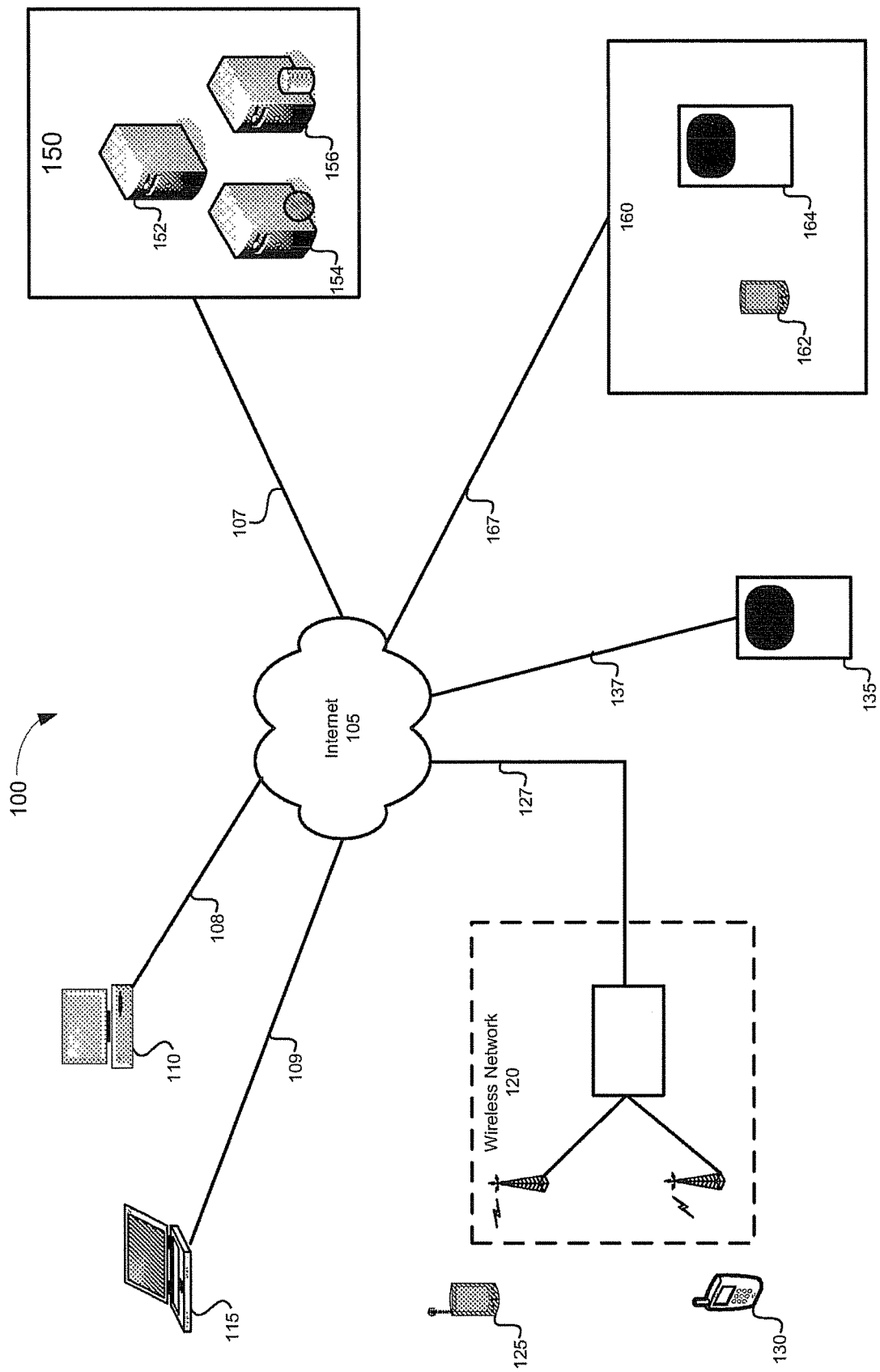
FIG. 1 is a block diagram of an exemplary system in which a representative embodiment of the present invention may be practiced.

Aspects of the present invention are related to systems and methods for navigating a software application. More specifically, certain embodiments of the present invention relate to systems and methods that trigger actions or sets of actions within a software application executed on a mobile device based at least in part on location identifiers.

A representative embodiment of the present invention aids users of software applications executed on mobile devices to navigate the software applications based at least in part on location identifiers received at the mobile device indicating a location of the mobile device.

Various embodiments provide a system 200 configured to navigate a software application 232. In a representative embodiment of the present invention, the system 200 comprises at least one processing unit 220. The processing unit 220 may be configured to execute the software application 232 and receive a location identifier identifying a location of the system 200. The processing unit 220 can be configured to apply a navigation rule 235 based at least in part on the received location identifier to determine a software application action and execute the determined software application action to select information of the software application 232.

Certain embodiments provide a method 300 for navigating a software application 232. In a representative embodiment of the present invention, the method 300 comprises executing 310, by at least one processing unit 220 of a mobile computing system 200, the software application 232. The method 300 comprises receiving 320, by the processing unit 220, a location identifier identifying a location of the mobile computing system 200. The method 300 comprises applying 330, by the processing unit 220, a navigation rule 235 based at least in part on the received location identifier to determine a software application action. The method comprises executing 340, by the processing unit 220, the determined software application action to select information of the software application 232.

As utilized herein, the terms "exemplary" or "example" means serving as a non-limiting example, instance, or illustration. As utilized herein, the term "e.g." introduces a list of one or more non-limiting examples, instances, or illustrations.

FIG. 1 is a block diagram of an exemplary system 100 in which a representative embodiment of the present invention may be practiced. As illustrated in FIG. 1, the system 100 includes an e-commerce system 150 comprising one or more web servers 154, one or more database servers 156, and one or more application servers 152. The elements of the e-commerce system 150 may be interconnected, and may singly or as a group be connected to Internet 105 via communication link 107, which may employ any suitable combination of wired or wireless data communication links. FIG. 1 also includes personal computers (PCs) 110, 115, which are connected to the Internet 105 by communications links 108, 109, respectively, which may be any suitable combination of wired or wireless data communication links. PCs 110, 115 may be any of, for example, a desktop computer, a laptop computer, a notebook computer, a netbook computer, a tablet computer, or any other electronic device having capabilities suitable for accessing the Internet 105 from, for example, a home, a small business, or any private or public area having suitable support for communications links 108, 109.

In addition, FIG. 1 illustrates a user communication device 125 that may comprise, for example, a tablet computer, smart phone, or other handheld electronic device capable of communicating to the e-commerce system 150 via a wireless network 120, a communication link 127, and the Internet 105. The communication device 125 of FIG. 1 may include suitable software applications, hardware, and logic to permit the communication device to display received web pages and other forms of digital information on a display of the communication device 125, and suitable user interface elements to permit a user to interact with the e-commerce system 150 using tactual, speech, and other forms of input. The wireless network 120 may support communication of digital information using any suitable wireless access technology including, for example, any combination of short-range, long range, Wi-Fi, cellular, personal communication system (PCS), Bluetooth, Near Field communication (NFC), radio frequency identification (RFID), to name only a few possible air interface technologies.

FIG. 1 also includes a portable telephone 130 that may be capable of communicating over one or more of a cellular, PCS, Wi-Fi, or other wireless communication network, and may have more limited yet sufficient functionality to interact with the e-commerce system 150 than that available from the PCs 110, 115 and the communication device 125.

In addition, FIG. 1 illustrates a kiosk device 135, which may permit users in retail and public venues to access the e-commerce system 150. The kiosk device 135 may be designed for indoor or outdoor use, and may be linked to the e-commerce system 150 via a communication link 137 and Internet 105, as shown, or may communicate directly with the e-commerce system 150 using any other suitable wired or wireless means. The kiosk 135 may have functionality that is equivalent, greater than, or less than the personal computers 110, 115, the communications device 125, and the cellular telephone 130.

The illustration of FIG. 1 also shows a retail establishment 160 that may, for example, be a "brick-and-mortar" business associated with the operator or sponsor of the e-commerce system 150. The retail establishment 160 may include a kiosk 164 that may support access to the e-commerce system 150 from the retail establishment 160, for those users that are located within the retail establishment 160. The illustration of FIG. 1 also includes a communication device 162 that may permit a sales associate and/or a customer of the retail establishment 160 to, for example, electronically access information about products and/or services available at the retail establishment 160, at other business locations of the operator of the retail establishment 160, or at other businesses operated by, for example, the operator, or businesses that partner with the operator of the e-commerce system 150. The communication device 162 may comprise, for example, a tablet computer, smart phone, or other handheld electronic device. The communication device 162 may include suitable software applications, hardware, and logic to permit the communication device to display received web pages and other forms of digital information on a display of the communication device 125, and suitable user interface elements to permit a user to interact with the e-commerce system 150 using tactual, speech, and other forms of input. Communication devices within the retail business 160 such as, for example, the communication device 162 and the kiosk 164 may communicate with the e-commerce system 150 via the Internet 105 and the communication link 167, which may be, for example, any suitable combination of wired and/or wireless communication technologies.

In accordance with a representative embodiment of the present invention, the elements of a system such as the e-commerce system 150 of FIG. 1 may include the functionality in a software application that enables user membership in a loyalty program of a business operator or sponsor of the e-commerce system 150, and the engagement of users in various events and activities. The e-commerce system 150 may include a software platform which tracks social interactions of users, and may track the activities of each member of the loyalty program. The tracking capabilities may include a flexible interaction tracking framework that supports multiple social interactions of the members. In addition, the software application may support interfacing a variety of user communication devices including, for example, tablet, desktop, notebook, notepad, and network computers, cellular telephone and smart phones, public and private kiosks, and other suitable electronic user communication devices available at the present time or in the future.

Figure 2:
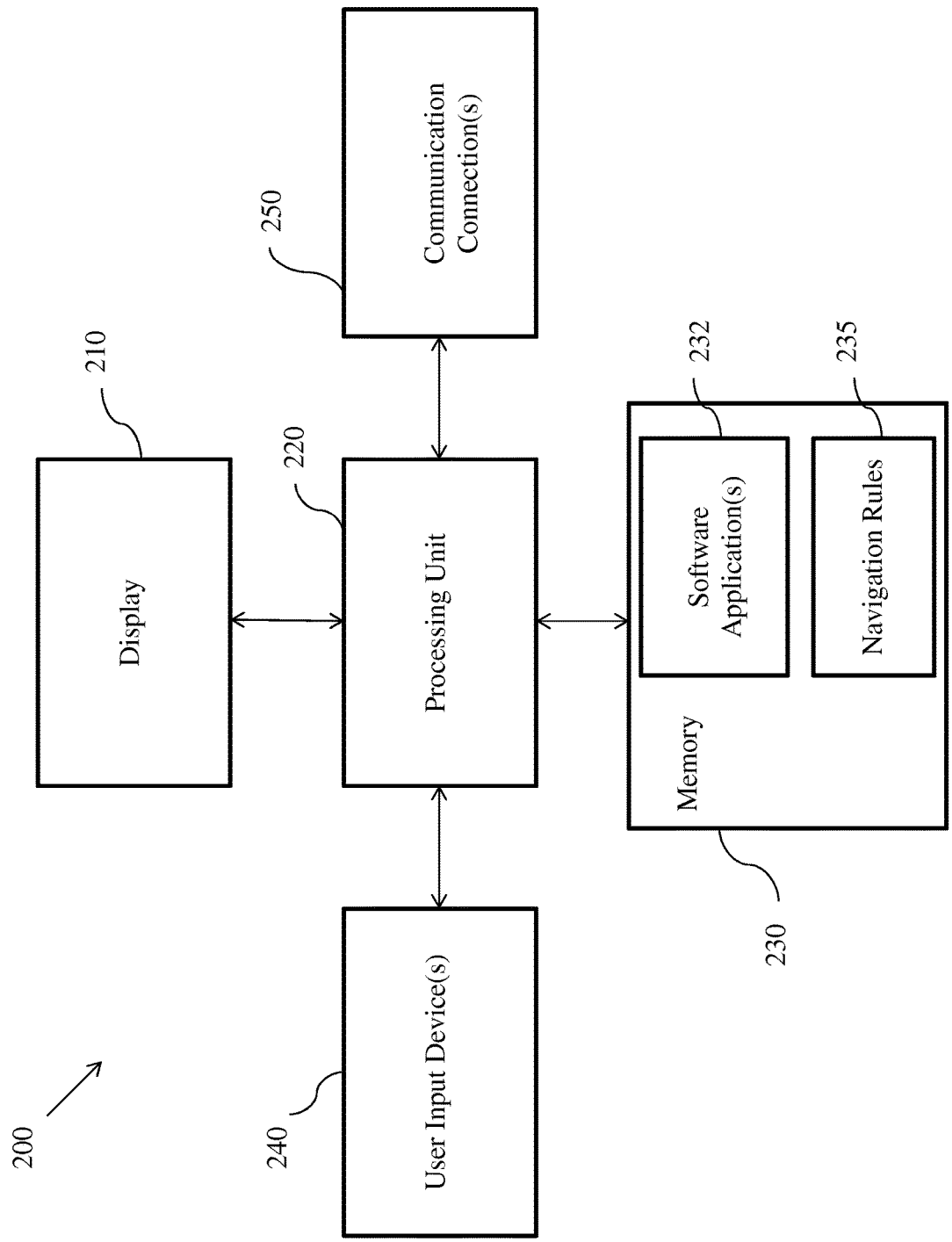
FIG. 2 is a block diagram of an exemplary computing system in which a representative embodiment of the present invention may be practiced.

FIG. 2 is a block diagram of an exemplary computing system 200 in which a representative embodiment of the present invention may be practiced. In various embodiments, the computing system 200 may correspond with one or more of the PCs 110, 115, user communication device 125, and/or the communication device 162, among other things, as illustrated in FIG. 1. In various embodiments, computing system 200 may be a mobile device, for example. Referring to FIG. 2, the computing system 200 includes a display 210, a processing unit 220, memory 230, user input device(s) 240, and communications connection(s) 250, among other things. Components of the computing system 200 may be implemented in software, hardware, firmware, and/or the like. The various components of the computing system 200 may be communicatively linked. Components of the computing system 200 may be implemented separately and/or integrated in various forms. For example, the display 210 and the user input device 240 may be integrated as a touchscreen display.

The display 210 may be any device capable of communicating visual information to a user. For example, a display 210 may include a liquid crystal diode display, a light emitting diode display, and/or any suitable display. The display 210 can be operable to display pages of a software application 232, or any suitable information. In various embodiments, the display 210 may display information provided by the processing unit 220, for example.

The processing unit 220 may be one or more central processing units, microprocessors, microcontrollers, and/or the like. The processing unit 220 may be an integrated component, or may be distributed across various locations, for example. The processing unit 220 may be capable of executing a software application 232, receiving input information from a user input device 240 and/or communication connection(s) 250, and generating an output displayable by a display 210, among other things. The processing unit 220 may be capable of executing any of the method(s) and/or set(s) of instructions discussed below in accordance with the present invention, for example. In certain embodiments, the processing unit 220 may access and apply navigation rules 235 from memory 230 to determine a software application action or set of actions based at least in part on received information received from user input device(s) 240 and/or communication connection(s) 250, such as computer system location identifiers, for example.

The memory 230 may be one or more computer-readable memories, for example, such as a hard disk, floppy disk, CD, CD-ROM, DVD, compact storage, flash memory, random access memory, read-only memory, electrically erasable and programmable read-only memory and/or any suitable memory. The memory 230 may include databases, libraries, sets of information, or other storage accessed by and/or incorporated with the processing unit 220, for example. The memory 230 may be able to store data temporarily or permanently, for example. The memory 230 may be capable of storing data generated by the processing unit 220 and/or instructions readable by the processing unit 220, among other things. In various embodiments, the memory stores one or more software applications 232 and/or software application navigation rules 235. The software application navigation rules 235 may correspond with one or more software applications 232, and/or one or more users or groups of users, for example. As an example, in a retail environment, customers and sales associates using a computer system 200 may execute different software applications 232 and/or different sets of navigation rules 235. The software application 232 and/or set of navigation rules 235 can be determined by default, user selection, login information, and/or any suitable selection mechanism. Certain embodiments provide that the navigation rules 235 may be accessed by the processing unit 220 to determine a software application action or set of actions, for example.

The navigation rules 235 may comprise rules for navigating a software application 232 based at least in part on information received from user input device(s) 240 and/or communication connection(s) 250, for example. As an example, location identifiers received over communication connection(s) 250 (e.g., geo-location, Wi-Fi triangulation, etc. information associated with a location of the computing system 200) and/or from user input device(s) 240 (e.g., RFID tag, NFC tag, etc. information associated with a location of the computing system 200) may be associated with an action or set of actions for navigating a software application 232 as defined by the navigation rules 235. In a retail environment, navigation rules 235 may define that location identifiers identifying a position of the computing system 200 to be near a front-loading washing machine section of a retail store trigger actions or sets of actions for navigating the software application 232 to information and/or pages related to front-loading washing machines, for example. As such, the navigation rules 235 may align a footprint of a retail store representing a tangible hierarchical navigation with a virtual software application 232 hierarchy to define resulting actions.

In various embodiments, the navigation rules 235 may define actions or sets of actions for combinations of information received from user input device(s) 240 and/or communication connection(s) 250, for example. As an example, the navigation rules 235 may be applied based on a combination of location identifiers and user inputs. In a retail environment, location identifiers identifying a position of the computing system 200 to be near a front-loading washing machine section of a retail store may trigger actions or sets of actions for navigating the software application 232 to information and/or pages related to front-loading washing machines, and additional input information (e.g., button depressions, touchscreen selections, computer system orientation and/or movement detections, and/or voice commands, among other things) can trigger actions or sets of actions for further navigating the software application 232 to information and/or pages related to, for example, a particular front-loading washing machine, front-loading washing machine reviews, a purchase page, front-loading washing machine comparison information, front-loading washing machine accessory information, and/or any suitable information as defined by the navigation rules 235.

The user input device(s) 240 may include any device(s) capable of communicating information from a user and/or at the direction of the user to the processing unit 220 of the computing system 200, for example. The user input device(s) 240 may include button(s), a touchscreen, near field communication (NFC) readers, radio frequency identification (RFID) readers, motion tracking, orientation detection, voice recognition, a mousing device, keyboard, and/or any other device capable of receiving a user directive. In certain embodiments, one or more of the user input devices 240 may be integrated into other components, such as the display 210, for example. As an example, user input device 240 may include a touchscreen display 210.

In various embodiments, the information provided by the user input device(s) 240 to the processing unit 220 may be processed by the processing unit 220 to navigate a software application 232, for example. As an example, button depressions, touchscreen selections, computer system orientation and/or movement detections, NFC tag information, RFID tag information, and/or voice commands, among other things, may be received from the user input device(s) 240 and processed by the processing unit 220 to trigger a software application action or set of actions as defined by navigation rules 235 to navigate the software application 232 on a display 210. Aspects of the present technology provide that NFC tag information, RFID tag information, and/or the like may identify a location, among other things. For example, in a retail environment, if an NFC reader, RFID reader, or the like, of the computing system 200 is waved near a tag in the proximity of front-loading washing machines in a retail store, the tag information may trigger an action or set of actions to navigate a software application 232 to display information related to front-loading washing machines.

The communication connection(s) 250 allow communication between the computing system 200 and other external systems, for example. The communication connection(s) 250 may include wired and/or wireless connections, for example. Wireless connections may include, for example, any combination of short-range, long range, Wi-Fi, cellular, personal communication system (PCS), Bluetooth, Near Field communication (NFC), radio frequency identification (RFID), or any suitable wireless connection.

In various embodiments, the information provided by the communication connection(s) 250 to the processing unit 220 may be processed by the processing unit 220 to navigate a software application 232, for example. As an example, geo-location and Wi-Fi triangulation information, among other things, may be received from the communication connection(s) 250 and processed by the processing unit 220 to trigger a software application action or set of actions as defined by navigation rules 235 to navigate the software application 232 on a display 210. Aspects of the present technology provide that geo-location information, Wi-Fi triangulation information, and the like, may identify a location, among other things. For example, in a retail environment, if the processing unit 220 receives geo-location information, Wi-Fi triangulation information, or the like, over communication connection(s) 250 indicating that the computing system 200 is in the proximity of front-loading washing machines in a retail store, the information may trigger an action or set of actions to navigate a software application 232 to display information related to front-loading washing machines.

FIG. 3 is a flowchart illustrating an exemplary method for navigating a software application 232, in accordance with a representative embodiment of the present invention. The actions of the method of FIG. 3 may be performed using elements of the computing system 200 of FIG. 2 including, for example, the display 210, processing unit 220, memory 230 (including navigation rules 235), user input device(s) 240, and/or communications connection(s) 250. The computing system 200 may be arranged to support the navigation of a software application 232 executed on the computing system, for example.

The method of FIG. 3 begins at block 310, where the processing unit 220 executes a software application 232. The executed software application 232 may, for example, be displayed on the display 210 of the computing system 200. Next, at block 320, the processing unit 220 may receive a location identifier from one or more of the user input device(s) 240 and the communication connection(s) 250. The location identifier may include, for example, RFID tags, NFC tags, geo-location information, Wi-Fi triangulation information, and/or any suitable information identifying the location of the computing system 200.

Following receipt of the location identifier, the method of FIG. 3 may, at block 330 commence applying navigation rules 235, by the processing unit 220, based at least in part on the received location identifier to determine a software application or set of actions. For example, the navigation rules 235 may define that the received location identifier is associated with certain information and/or one or more pages of a software application 232. The navigation rules 235 may be accessed from memory 230 and can comprise rules for navigating a software application 232. The navigation rules 235 may correspond with one or more software applications 232, and/or one or more users or groups of users, for example. The software application 232 and/or set of navigation rules 235 can be determined by default, user selection, login information, and/or any suitable selection mechanism.

Once a software action or set of actions is determined, the processing unit 220, at block 340, may execute the determined software application action or set of actions to navigate the software application 232 on the display 210. The action or set of actions may include, for example, navigation actions for selecting a particular page and/or information to display on the display 210.

In operation, a computing system 200, which may be a mobile device such as a mobile phone, personal digital assistant, tablet computer, laptop computer, or any suitable mobile device, operated by a user may execute a software application 232 stored in memory 230 of the computing system 200. The software application 232 may be executed by a processing unit 220 of the computing system 200. The software application 232 can be selected by default, user selection, login information, and/or any suitable selection mechanism. The software application 232 may correspond with one or more sets of navigation rules 235 stored in memory 230. The one or more sets of navigation rules 235 may be associated with one or more users or groups of users, for example. The set of navigation rules applied to navigate the selected software application 232 can be determined by default, user selection, login information, and/or any suitable selection mechanism.

While the computing system 200 is executing the software application 232, the processing unit 220 may receive location identifiers from user input device(s) 240 and/or communication connection(s) 250 identifying a location of the computing system 200. For example, a tag reader (e.g., NFC or RFID) may scan a tag and communicate the tag information to the processing unit 220. The tag information may correspond with a location of the computing system 200. As another example, location information (e.g., geo-location or Wi-Fi triangulation) may be received over communication connection(s) 250 at the processing unit 220 identifying the location of the computing system 200. The processing unit 220 may apply the selected set of navigation rules 235 based at least in part on the received location identifiers to determine a software application action or set of actions. For example, if the user is a sales associate assisting a customer in a retail environment, the location of the computing system 200 operated by the sales associate may correspond with an action or set of actions for navigating the software application 232 to information and/or pages of the software application 232 that relate to nearby products or services in the retail store.

In certain embodiments, the processing unit 220 may additionally and/or alternatively receive user inputs from user input device(s) 240 and/or communication connection(s) 250. The processing unit 220 may apply the selected set of navigation rules 235 based at least in part on the received user inputs to determine a software application action or set of actions. For example, user inputs (e.g., button depressions, touchscreen selections, computer system orientation and/or movement detections, and/or voice commands, among other things) can trigger actions or sets of actions for further navigating the software application 232 to information and/or pages as defined by the navigation rules 235.

Aspects of the present invention may be seen in a system 200 configured to navigate a software application 232. In a representative embodiment of the present invention, the system 200 comprises at least one processing unit 220. The processing unit 220 may be configured to execute the software application 232 and receive a location identifier identifying a location of the system 200. The processing unit 220 can be configured to apply a navigation rule 235 based at least in part on the received location identifier to determine a software application action and execute the determined software application action to select information of the software application 232.

In various embodiments, the system 200 comprises a display 210 configured to display the selected information. In certain embodiments, the selected information comprises a page of the software application 232. In a representative embodiment of the present invention, the system 200 comprises a memory 230 configured to store one or more of the software application 232 and the navigation rule 235. In various embodiments, the system 200 comprises a plurality of navigation rules sets 235. The navigation rule 235 is associated with one of the plurality of navigation rule sets 235. In certain embodiments, each of the plurality of navigation rule sets 235 is associated with at least one of one of a plurality of users, one of a plurality of user groups, and one of a plurality of software applications 232.

In a representative embodiment of the present invention, the system 200 comprises one or more of a user input device 240 and a communication connection 250 configured to provide the processing unit 220 with the location identifier. In various embodiments, the user input device 240 comprises one or more of a Near Field Communication (NFC) reader, and a radio frequency identification (RFID) reader. In certain embodiments, the location identifier comprises one or more of tag information, geo-location information, and Wi-Fi triangulation information. In a representative embodiment of the present invention, the system 200 is a mobile device.

Various embodiments provide a method 300 for navigating a software application 232. In a representative embodiment of the present invention, the method 300 comprises executing 310, by at least one processing unit 220 of a mobile computing system 200, the software application 232. The method 300 comprises receiving 320, by the processing unit 220, a location identifier identifying a location of the mobile computing system 200. The method 300 comprises applying 330, by the processing unit 220, a navigation rule 235 based at least in part on the received location identifier to determine a software application action. The method comprises executing 340, by the processing unit 220, the determined software application action to select information of the software application 232.

In a representative embodiment of the present invention, the method 300 comprises displaying 340 the selected information. In certain embodiments, the selected information comprises a page of the software application 232. In various embodiments, the method 300 comprises storing at least one of the software application 232 and the navigation rule in a memory 230. In a representative embodiment of the present invention, the navigation rule 235 is associated with one of a plurality of navigation rule sets 235. In various embodiments, each of the plurality of navigation rule sets is associated with at least one of one of a plurality of users, one of a plurality of user groups, and one of a plurality of software applications 232.

In certain embodiments, the method 300 comprises selecting the software application 232 for execution, wherein the selecting is based on one or more of a default setting, a user selection, and login information. In a representative embodiment of the present invention, the method 300 comprises selecting a set of navigation rules comprising the navigation rule based on one or more of a default setting, a user selection, and login information. In various embodiments, the location identifier comprises one or more one of tag information, geo-location information, and Wi-Fi triangulation information.

In a representative embodiment of the present invention, the method 300 comprises receiving, by the processing unit 220, a user input. The method 300 comprises applying, by the processing unit 220, a navigation rule 235 based at least in part on the received user input to determine a software application action. The method 300 comprises executing, by the processing unit 220, the determined software application action to select information of the software application 232 to display.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A mobile device configured to navigate a software application, the mobile device comprising:
at least one processing unit configured to:
execute the software application having a plurality of existing software application pages stored at the mobile device, wherein each of the plurality of existing software application pages is associated, by a plurality of navigation rules, with a location identifier location corresponding with a specific location of one or more of a category of products, a specific product, or a service in a retail environment;
receive a location identifier identifying a device location of the mobile device executing the software application that is at the specific location of the one or more of the product category, the specific product, or the service in the retail environment;
apply a navigation rule from the plurality of navigation rules stored at the mobile device based at least in part on the received location identifier to determine a software application action of the executed software application, wherein the plurality of navigation rules defines associations between a plurality of location identifier locations and the plurality of existing software application pages of the executed software application; and
execute the determined software application action to select and display a software application page from the plurality of existing software application pages of the executed software application, the software application page associated with the received location identifier by the navigation rule, wherein the execution of the determined software application action to select and display the software application page is triggered by the at least one processing unit receiving the location identifier identifying the device location is at the specific location of the one or more of the category of products, the specific product, or the service in the retail environment;
one or both of a tag reader and a communication connection configured to provide the at least one processing unit with the location identifier; and
a display configured to present the software application page automatically selected from the plurality of existing software application pages of the executed software application.

2. The mobile device according to claim 1, wherein the selected and displayed software application page provides information related to the category of products at the device location in the retail environment.

3. The mobile device according to claim 1, wherein the selected and displayed software application page provides information related to the specific product at the device location in the retail environment.

4. The mobile device according to claim 1, comprising a memory configured to store at least one of the software application and the navigation rule.

5. The mobile device according to claim 1, comprising a plurality of navigation rules sets, wherein the navigation rule is associated with one of the plurality of navigation rule sets.

6. The mobile device according to claim 5, wherein each of the plurality of navigation rule sets is associated with at least one of:
one of a plurality of users,
one of a plurality of user groups, and
one of a plurality of software applications.

7. The mobile device according to claim 1, wherein the tag reader comprises at least one of:
a Near Field Communication (NFC) reader, and
a radio frequency identification (RFID) reader.

8. The mobile device according to claim 1, wherein the location identifier comprises at least one of:
tag information,
geo-location information, and
Wi-Fi triangulation information.

9. A method for navigating a software application, the method comprising:
executing, by at least one processing unit of a mobile computing system, the software application having a plurality of existing software application pages stored at the mobile computing system, wherein each of the plurality of existing software application pages is associated, by a plurality of navigation rules, with a location identifier location corresponding with a specific location of one or more of a category of products, a specific product, or a service in a retail environment;
receiving, by the at least one processing unit from one or both of a tag reader and a communication connection of the mobile computing system, a location identifier identifying a device location of the mobile computing system executing the software application that is at the specific location of the one or more of the product category, the specific product, or the service in the retail environment;
applying, by the at least one processing unit, a navigation rule from the plurality of navigation rules stored at the mobile computing system based at least in part on the received location identifier to determine a software application action of the executed software application, wherein the plurality of navigation rules defines associations between a plurality of location identifier locations and the plurality of existing software application pages of the executed software application; and
executing, by the at least one processing unit, the determined software application action to select and display, at a display of the mobile computing system, a software application page from the plurality of existing software application pages of the executed software application, the software application page associated with the received location identifier by the navigation rule, wherein the execution of the determined software application action to select and display the software application page is triggered by the at least one processing unit receiving the location identifier identifying the device location is at the specific location of the one or more of the category of products, the specific product, or the service in the retail environment.

10. The method according to claim 9, wherein the selected and displayed software application page provides information related to the category of products at the device location in the retail environment.

11. The method according to claim 9, wherein the selected and displayed software application page provides information related to the specific product at the device location in the retail environment.

12. The method according to claim 9, comprising storing at least one of the software application and the navigation rule in a memory.

13. The method according to claim 9, wherein the navigation rule is associated with one of a plurality of navigation rule sets.

14. The method according to claim 13, wherein each of the plurality of navigation rule sets is associated with at least one of:
one of a plurality of users,
one of a plurality of user groups, and
one of a plurality of software applications.

15. The method according to claim 9, comprising selecting the software application for execution, wherein the selecting is based on at least one of:
a default setting,
a user selection, and
login information.

16. The method according to claim 9, comprising selecting a set of navigation rules comprising the navigation rule based on at least one of:
a default setting,
a user selection, and
login information.

17. The method according to claim 9, wherein the location identifier comprises at least one of:
tag information,
geo-location information, and
Wi-Fi triangulation information.

18. The method according to claim 9, comprising:
receiving, by the at least one processing unit, a user input;
applying, by the at least one processing unit, a navigation rule based at least in part on the received user input to determine a software application action; and
executing, by the at least one processing unit, the determined software application action to select information of the software application to display.

19. A non-transitory computer-readable medium encoded with a set of instructions, the set of instructions being executable by a mobile device for causing the mobile device to perform steps comprising:
executing a software application having a plurality of existing software application pages stored at the mobile device, wherein each of the plurality of existing software application pages is associated, by a plurality of navigation rules, with a location identifier location corresponding with a specific location of one or more of a category of products, a specific product, or a service in a retail environment;
receiving, from one or both of a tag reader and a communication connection of the mobile device, a location identifier identifying a device location of the mobile device executing the software application that is at the specific location of the one or more of the product category, the specific product, or the service in the retail environment;
applying a navigation rule from the plurality of navigation rules stored at the mobile device based at least in part on the received location identifier to determine a software application action of the executed software application, wherein the plurality of navigation rules defines associations between a plurality of location identifier locations and the plurality of existing software application pages of the executed software application; and
executing the determined software application action to select and display a software application page from the plurality of existing software application pages of the executed software application on a display of the mobile device, the software application page associated with the received location identifier by the navigation rule, wherein the execution of the determined software application action to select and display the software application page is triggered by the at least one processing unit receiving the location identifier identifying the device location is at the specific location of the one or more of the category of products, the specific product, or the service in the retail environment.

20. The non-transitory computer-readable medium encoded with the set of instructions according to claim 19, wherein the selected and displayed software application page provides information related to the category of products at the device location in the retail environment.

21. The non-transitory computer-readable medium encoded with the set of instructions according to claim 19, wherein the selected and displayed software application page provides information related to the specific product at the device location in the retail environment.

22. The non-transitory computer-readable medium encoded with the set of instructions according to claim 19, comprising storing at least one of the software application and the navigation rule in a memory.

23. The non-transitory computer-readable medium encoded with the set of instructions according to claim 19, wherein the navigation rule is associated with one of a plurality of navigation rule sets.

24. The non-transitory computer-readable medium encoded with the set of instructions according to claim 23, wherein each of the plurality of navigation rule sets is associated with at least one of:
  one of a plurality of users,
  one of a plurality of user groups, and
  one of a plurality of software applications.

25. The non-transitory computer-readable medium encoded with the set of instructions according to claim 19, comprising selecting the software application for execution, wherein the selecting is based on at least one of:
  a default setting,
  a user selection, and
  login information.

26. The non-transitory computer-readable medium encoded with the set of instructions according to claim 19, comprising selecting a set of navigation rules comprising the navigation rule based on at least one of:
  a default setting,
  a user selection, and
  login information.

27. The non-transitory computer-readable medium encoded with the set of instructions according to claim 19, wherein the location identifier comprises at least one of:
  tag information,
  geo-location information, and
  Wi-Fi triangulation information.

28. The non-transitory computer-readable medium encoded with the set of instructions according to claim 19, comprising:
  receiving a user input;
  applying a navigation rule based at least in part on the received user input to determine a software application action; and
  executing the determined software application action to select information of the software application to display.

29. The non-transitory computer-readable medium encoded with the set of instructions according to claim 19, wherein the navigation rule from the plurality of navigation rules is applied based solely on the received location identifier to determine a software application action of the executed software application.

30. The system according to claim 1, wherein the navigation rule from the plurality of navigation rules is applied based solely on the received location identifier to determine the software application action of the executed software application.

31. The method according to claim 9, wherein the applying the navigation rule from the plurality of navigation rules is based solely on the received location identifier to determine the software application action of the executed software application.

* * * * *